Dec. 17, 1968           E. J. KNAPP           3,417,170
REDUCTION OF CYCLE TIME BY THE USE OF HEATED
EXPANDED POLYSTYRENE BEADS
Filed Aug. 27, 1964
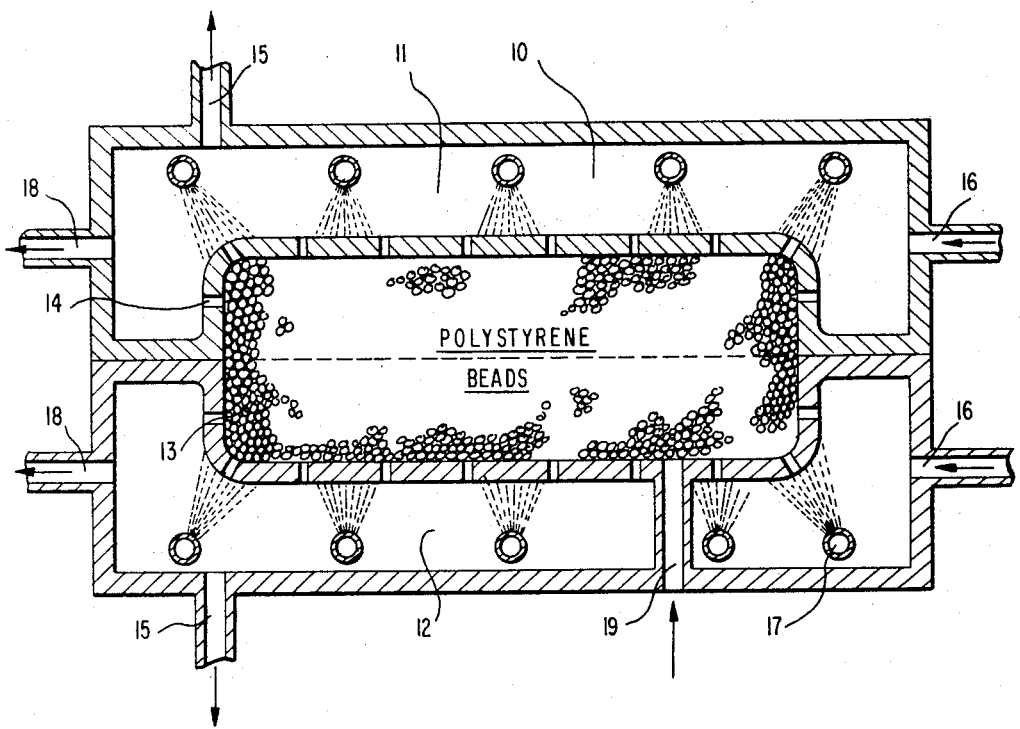
INVENTOR.
EUGENE J. KNAPP
BY
ATTORNEYS

United States Patent Office

3,417,170
Patented Dec. 17, 1968

3,417,170
REDUCTION OF CYCLE TIME BY THE USE OF HEATED EXPANDED POLYSTYRENE BEADS
Eugene J. Knapp, Corning, N.Y., assignor to Corning Glass Works, Corning, N.Y., a corporation of New York
Filed Aug. 27, 1964, Ser. No. 392,525
3 Claims. (Cl. 264—51)

ABSTRACT OF THE DISCLOSURE

A method of molding resinous, cellular shaped articles comprising preheating thermoplastic resin beads containing a blowing agent to a temperature higher than the vaporization temperature of the blowing agent but lower than the fusion temperature of the resin prior to fusion of the beads in a mold to produce a molded cellular article.

---

This invention relates to the formation of molded cellular articles and more particularly to a method for molding cellular shaped articles from thermoplastic synthetic resinous beads. Still more particularly, this invention provides a method for molding cellular shaped articles in which the cooling step is materially reduced in length and the time cycle required for molding is shortened.

In the prior art method of molding cellular articles from thermoplastic beads, the beads are introduced into a mold while they are at room temperautre. The bead-filled mold is then heated to a temperature of at least the fusion temperature of the thermoplastic resin thereby to form the cellular shaped article. The heat supplied to the bead-filled mold must be high enough to cause vaporization and expansion of the blowing agent contained in the beads. As the thermoplastic material surrounding the blowing agent acts as an insulator, a great amount of heat must be supplied to the mold to affect vaporization of the blowing agent. Prior to removing the finished article from the mold, this heat must be dissipated, and this is usually accomplished by means of a lengthy and elaborate cooling cycle.

The lengthy cooling cycle materially increases the time required to produce a cellular article and results in an increased cost to the manufacturer of these articles. Thus, any improvement in the molding arts which will eliminate or substantially reduce the cooling cycle would represent a great step forward.

Accordingly, it is the object of this invention to provide a method for molding cellular articles in which the cooling step is materially reduced.

This and other objects of this invention are accomplished by pre-heating the expandable synthetic resin beads containing a blowing agent prior to their introduction into the mold. The beads are preheated to a temperature higher than the vaporization temperature of the blowing agent and lower than the fusion temperature of the thermoplastic resin. The beads are maintained at the preheating temperature and then are introduced into the mold while they are still hot. In the mold, the beads are heated to the fusion temperature of the thermoplastic resin, which causes them to coalesce and thereby form the molded cellular article.

As the beads are at a relatively high temperature when introduced into the mold, the additional heat which must be supplied to the mold to cause fusion is small. Furthermore, the heat necessary to vaporize the contained propellant has been supplied prior to introducing the beads into the mold. This is important, since the beads act as insulators for the propellant. Therefore, if the heat necessary to vaporize the blowing agent must be supplied to the beads after introduction into the mold, it is necessary to heat the beads to a temperature greatly in excess of their fusion temperature to assure rapid and full vaporization of the propellant. For this reason, when the beads are preheated in accordance with this invention the average bead temperature in the mold and consequently the total heat in the molded piece is less than prevails when conventional molding techniques are employed. As a result, the amount of heat which must be withdrawn from the molded piece during the cooling cycle is substantially reduced.

Generally, it is found that the required cooling time is materially reduced when the method of this invention is employed, thus facilitating a shortened cooling cycle.

An additional advantage resulting from the method of this invention is that the time required to affect fusion of the beads is substantially less than that in conventional molding practice. This is because less heat is put into the mold during the fusion step. The shortened fusion step and reduced cooling cycle, which will result from this invention, are of great practical significance. In view of the fact that the total time which the beads are in the mold is greatly reduced, the expensive molding equipment employed to produce these cellular articles is able to turn out more articles per hour, thereby, reducing the total cost of each unit.

The temperature to which the beads are preheated is critical. They must be preheated to a temperature between the vaporization temperature of the blowing agent and the fusion temperature of the thermoplastic. By heating to a temperature in this range, the blowing agent is completely vaporized before the beads are introduced into the mold, but there is no premature fusion of the beads. The preheating temperature is therefore only dependent upon the particular thermoplastic resin and blowing agent combination used. It should be understood that when the beads are heated the blowing agent vaporizes but does not escape from the beads.

When polystyrene beads are used in this invention with a blowing agent having a vapor point well below the fusion temperature of the plastic, it is found that a preheating temperature of from about 28° C. to 65° C. is preferable. In a preferred embodiment of this invention, the beads will be preheated to a temperature which is only slightly less than the fusion temperature of the plastic. The closer to the fusion temperature of the plastic the beads are preheated, the less heat input is required in the molding step.

The preheating of the beads and blowing agent may be carried out in any manner which will bring the charge to the desired temperature. They can be heated in an oven or immersed in a nonsolvent for the thermoplastic, such as water, which is at the desired temperature. It is important that the charge be introduced into the mold while the beads are still hot. This can be accomplished by quickly transferring the charge from the preheating media to the mold or by introducing the beads into the mold through a heated conduit.

Once the beads are in the mold, the heat necessary to cause fusion can be supplied by conventional molding techniques. Steam can be introduced into the mold for this purpose. As discussed above, only a small amount of heat is necessary at this stage of the process and this fusion step will be very short. When polystyrene beads are used, the molding temperature is preferably between 68° C. and 125° C. The bead-filled mold must be heated to a temperature of at least the fusion temperature of the thermoplastic resin. If desired, a temperature in excess of this may be employed but this is unnecessary.

The method of this invention may be employed to form cellular articles from any of the expandable thermoplastic resins known in the prior art. Examples of suitable thermoplastic materials include the homopolymers and copolymers of polystyrene, the homopolymers and copolymers of alkyl or halo-substituted polystyrene, and homopolymers and copolymers of various other synthetic resins such as polyvinyl chloride, polyvinylidene chloride, polyacrylic esters, polymethacrylic esters, polyacrylonitrile, and polyolefins, such as polyethylene and polypropylene.

The blowing agents used to form the expandable thermoplastic resinous material may be any of those which are known in the prior art to be suitable for this purpose. Thus, any heat sensitive gas generating agent may be used. This includes liquid blowing agents such as petroleum ether, pentane, hexane, heptane, cyclopentane, cyclohexane and cyclopentadiene, or mixtures of these liquids. Furthermore, solid materials which decompose on heating to generate a gas may be employed. These include such solid blowing agents such as $\alpha,\alpha'$-azobisisobutyryl nitrate, p,p'-oxy-bis benzene sulfonyl hydrazide and sodium carbonate. The expandabel synthetic resinous material is prepared with conventional quantities of the particular blowing agent used. The quantity depends upon the amount of the specific propellant substance that may be necessary for a given thermoplastic to accomplish efficient foaming action upon application of heat to the expandable mass. The blowing agents may be incorporated into the thermoplastic materials by techniques conventional in the art.

The thermoplastic beads containing the blowing agent may be of any conventional size and shape. These beads generally have a diameter of from 0.3 to 10 millimeters. They are usually pre-expanded.

The method of this invention may be carried out in any suitable molding apparatus, such as that shown in the accompanying drawing. As shown, a multiple part mold 10, having mold sections 11 and 12 can be used. The pre-heated expandable synthetic resin beads are introduced into a mold cavity 13 through filling tube 19. The beads are then brought to a desired molding temperature by passing a heated gas or steam around mold cavity 13. The hot gas is introduced through inlets 16 and leaves the mold by way of drains 18. Following completion of the heating step, which normally is about one second, the cellular article is cooled by spraying water from jets 17 onto the surface of mold cavity 13. Optionally, mold cavity 13 can be vented, after the heating step and before the cooling step, by use of a vacuum. A source of vacuum (not shown) is applied to mold cavity 13 by way of vacuum openings 15 and vacuum inlets 14.

Further illustration of this invention is provided by the following example:

Example

About 0.10 lb. of pre-expanded polystyrene beads, 0.8 millimeter, in diameter, and containing about 5% by weight of n-pentane as a blowing agent, are placed in an oven and heated to a temperature of 60° C. The polystyrene has a fusion temperature of 65° C., and the n-pentane blowing agent has a vaporization temperature of 30° C. The beads are heated in the oven for 30 minutes, which is sufficient to bring them to the desired temperature, causing the n-pentane to vaporize. The polystyrene beads, at a temperature of about 60° C., are then introduced into a mold having a volume of approximately 0.05 cu. ft. The bead-filled mold is heated to a temperature of 70° C., and held at this temperature for one second. The beads are then cooled by spraying cooling water on the mold. The cellular polystyrene article is then removed from the mold. The total molding time, from the introduction of the heated beads into the mold to the removal of the finished cellular article, was 8 seconds.

While there have been shown and described and pointed out the fundamental novel features of the invention as applied to the preferred embodiment, it will be understood that various omissions and substitutions and changes in the details of the process illustrated may be made by those skilled in the art without departing from the spirit of the invention. It is the intention, therefore, to be limited only as indicated by the scope of the following claims.

What is claimed is:

1. In a method of molding cellular shaped articles by heating thermoplastic pre-expanded synthetic resin beads containing a blowing agent having a vapor point below the fusion temperature of said beads in a substantially rigid mold, followed by cooling said shaped article prior to removing said article from said mold; the improvement of reducing the cycle time of said method which comprises pre-heating in a first step said thermoplastic synthetic resin beads to a temperature only slightly less than the fusion temperature of said thermoplastic synthetic resin, introducing the heated beads into a mold, then heating the bead filled mold to a temperature of at least the fusion temperature of said thermoplastic synthetic resin and cooling said mold to thereby produce a molded cellular shaped article.

2. The method of claim 1 wherein said thermoplastic synthetic resin is polystyrene.

3. The method of claim 1 wherein said blowing agent is a member selected from the group consisting of petroleum ether, pentane, hexane, hectane, cyclopentane, cyclohexane and cyclopendiene.

References Cited

UNITED STATES PATENTS

| 3,065,500 | 11/1962 | Berner | 264—53 X |
| 3,129,464 | 4/1964 | Heider | 264—53 X |
| 3,162,704 | 12/1964 | Attanasio et al. | 264—53 |
| 3,233,016 | 2/1966 | Kracht | 264—53 |
| 3,278,658 | 10/1966 | Immel | 264—51 |

OTHER REFERENCES

Koppers booklet "Technical Maual Dylite Expandable Polystyrene, Mold Techniques and Mold Design." Bulletin C–9–273, Chapter 3e, Nov. 15, 1959, pp. 2–8, 12–17, Copy in Art Unit 146.

JULIUS FROME, *Primary Examiner.*

P. E. ANDERSON, *Assistant Examiner.*

U.S. Cl. X.R.

264—39; 28—5